United States Patent
Patel et al.

(10) Patent No.: US 9,414,135 B2
(45) Date of Patent: Aug. 9, 2016

(54) FLEXIBLE-CLIENT, FLEXIBLE-LINE INTERFACE TRANSPONDER

(71) Applicant: NEC Laboratories America, Inc., Princeton, NJ (US)

(72) Inventors: Ankitkumar Patel, Monmouth Junction, NJ (US); Konstantinos Kanonakis, New Brunswick, NJ (US); Junqiang Hu, Davis, CA (US); Philip Ji, Cranbury, NJ (US)

(73) Assignee: NEC Corporation (JP)

(*) Notice: Subject to any disclaimer, the term of this patent is extended or adjusted under 35 U.S.C. 154(b) by 0 days.

(21) Appl. No.: 14/573,483

(22) Filed: Dec. 17, 2014

(65) Prior Publication Data

US 2015/0181316 A1 Jun. 25, 2015

Related U.S. Application Data

(60) Provisional application No. 61/920,588, filed on Dec. 24, 2013.

(51) Int. Cl.
*H04Q 11/00* (2006.01)
*H04J 3/16* (2006.01)

(52) U.S. Cl.
CPC .......... *H04Q 11/0005* (2013.01); *H04J 3/1664* (2013.01); *H04Q 11/0062* (2013.01); *H04J 2203/0012* (2013.01); *H04J 2203/0019* (2013.01)

(58) Field of Classification Search
CPC . G01S 7/292; H04W 11/005; H04W 11/0062
USPC ......................................................... 398/45
See application file for complete search history.

(56) References Cited

U.S. PATENT DOCUMENTS

| | | | |
|---|---|---|---|
| 2011/0004700 A1* | 1/2011 | Sprague | H04J 3/1652 709/236 |
| 2011/0013911 A1* | 1/2011 | Alexander | H04B 10/29 398/79 |

(Continued)

OTHER PUBLICATIONS

Arabaci, M., et al. "Polarization-multiplexed rate-adaptive nonbinary-quasi-cyclic-LDPC-coded multilevel modulation with coherent detection for optical transport networks," Opt Express, Jan. 2010. pp. 1820-1832. vol. 18, No. 3.

(Continued)

*Primary Examiner* — David Payne
*Assistant Examiner* — Omar S Ismail
(74) *Attorney, Agent, or Firm* — Joseph Kolodka

(57) ABSTRACT

Methods and systems for flexible-client, flexible-link optical transponders include electrical-to-optical transponders, which accept client data from a flow distributor, and a first multiplexing switch that connects modulated optical carriers from the transponders to line interfaces. The electrical-to-optical transponders each include a flexible optical transport unit (OTU) framer module that compresses multiple optical data units (ODUs) into a single ODU having a higher order than any of the input ODUs to form an optical transport network (OTN) frame. An electrical-to-optical modulator modulates OTN frames onto a carrier. The transponder includes a second multiplexing switch that accepts optical carriers from line interfaces and optical-to-electrical transponders that accept modulated optical carriers from the second multiplexing switch. Each optical-to-electrical transponder includes a photodetector to convert the modulated optical carriers to the electrical domain and a flexible OTU framer module that decompresses received ODUs in OTN frames into multiple ODUs to form a bit stream.

8 Claims, 4 Drawing Sheets

(56) References Cited

U.S. PATENT DOCUMENTS

| | | | |
|---|---|---|---|
| 2012/0251106 A1* | 10/2012 | Valiveti | H04L 47/34 398/45 |
| 2013/0084063 A1* | 4/2013 | Hu | H04L 49/10 398/2 |
| 2013/0101292 A1* | 4/2013 | Lanzone | H04J 3/1652 398/66 |
| 2013/0108268 A1* | 5/2013 | Valiveti | H04J 3/1652 398/58 |
| 2013/0108273 A1* | 5/2013 | Valiveti | H04J 3/1652 398/79 |
| 2013/0343750 A1* | 12/2013 | Lanzone | H04L 1/0009 398/34 |
| 2014/0186034 A1* | 7/2014 | Bialkowski | H04L 47/12 398/45 |
| 2014/0355991 A1* | 12/2014 | Cameirao | H04B 10/2575 398/79 |

OTHER PUBLICATIONS

Huang, Y., et al. "Terabit/s Optical Superchannel with Flexible Modulation Format for Dynamic Distance/Route Transmission," Proc. of OFCNFOEC, Mar. 2012. No. OM3H.4. pp. 1-3.

Ji, P., "Software Defined Optical Network," Proc. of ICOCN, Nov. 2012. pp. 31-34.

Jinno, M., et al. "IP Traffic Offloading to Elastic Optical Layer Using Multi-flow Optical Transponder," Proc, of ECOC, Mar. 2011, No. Mo.2.K.2. pp. 1-3.

Jinno, M. et al. "Distance-Adaptive Spectrum Resource Allocation in Spectrum-Sliced Elastic Optical Path Network," IEEE Communications Magazine, Aug. 2010. vol. 48, No. 8, pp. 138-145.

McKeown, N., et al. "OpenFlow: Enabling Innovation in Campus Networks," Proc. of ACM SIGCOMM, Apr. 2008, vol. 38, issue 2, pp. 69-74.

Patel, A., et al. "QoS-Aware Optical Burst Switching in OpenFlow Based Software-Defined Optical Networks," Proc. of ONDM, Apr. 2013. pp. 275-280.

Qian, D., et al. "41.25 Gb/s Real-Time OFDM Receiver for Variable Rate WDM-OFDMA-PON Transmission," Proc. of OFCNFOEC, Mar. 2010, No. PDPD9. pp. 1-3.

Wellbrock, G., et al. "Investigation of Flexible Channel Spacing for High Spectral Efficiency Using Real-Time 100GbE Transponder," Proc. of OECC, Jul. 2012, No. 5A2-3. pp. 419-420.

Xia, T., et al. "High Capacity Field Trials of 40.5 Tb/s for LH Distance of 1,822 km and 54.2 Tb/s for Regional Distance of 634 km," Proc. of OFCNFOEC, Mar. 2013, No. PDP5A. pp. 1-3.

Zami. T., et al. "Higher capacity with smaller global energy consumption in core optical networks due to elastic channel spacing," Proc. of ECOC, Sep. 2010. No. Mo.1.D.3. pp. 1-3.

\* cited by examiner

FLEXIBLE-CLIENT, FLEXIBLE-LINE INTERFACE TRANSPONDER

RELATED APPLICATION INFORMATION

This application claims priority to provisional application Ser. No. 61/920,588, filed on Dec. 24, 2013, and the contents thereof are incorporated herein by reference.

BACKGROUND OF THE INVENTION

Software defined networks (SDNs) enable network programmability to support multi-vendor, multi-technology, multi-layer communications. Recently, efforts have been made to integrate optical transport within an IP/Ethernet-based SDN architecture to leverage optical transmission benefits such as low interference, long reach, and high capacity transmission with lower power consumption. Such networks are referred to as transport SDNs (T-SDNs). T-SDNs can be realized by enabling flexibility and programmability in transmission and switching network elements, such as transponders and reconfigurable optical add-drop multiplexers (ROADMs), management of optical channels such as by flexible-grid channel mapping, and extracting control plane intelligence from physical hardware to the centralized controller.

Recent efforts toward enabling flexibility and programmability in optical transponders have produced transponders with flexible modulation formats. The modulation formats are changed dynamically to meet optical signal-to-noise ratio (OSNR) requirements at receivers. Some optical technologies with flexible channel spacing exist using transponders that generate super-channels. In other cases, transponders with flexible forward error correction (FEC) coding are demonstrated. However, since transponders are not used as store-and-forward network elements, data flow conservation must be observed inside the transponder. Thus, transmission rate at a line interface must be the same as the data rate at a client interface. The rate adaptation flexibility at line interfaces therefore cannot be achieved until and unless the rate at client interfaces can be dynamically adapted.

Existing interfaces use transponders that are connected to multiple low-speed router ports of the same router. Flexible client and line interfaces can be realized by controlling and managing the router ports as a single virtual router port, enabling/disabling such ports in proportion to traffic. Distribution of traffic over multiple Ethernet interfaces of the router ports can be performed using link aggregation groups, which use inverse multiplexing to distribute a large capacity Ethernet payload among multiple parallel channels.

In a multi-flow architecture, a transponder may be connected to a router using a high-speed fixed-Ethernet interface. Inside the transponder, the Ethernet frames are distributed over a number of fixed-rate optical transport unit (OTU) framers proportional to the effective traffic volume using a flow distributor, which distributes Ethernet frames (for example, based on virtual local area network tags) over fixed-rate OTU channels. The optical channels established from the OTU framers form a link aggregation group channel. Thus, the transponder can change the link rate of a line aggregation group channel by adapting the distributions of Ethernet frames over the fixed-rate OTU framers.

However, existing technologies are limited in the granularity at which they can provide flexible client and line interfaces. For example, using LAG and multiple WDM channels as described above, sub-wavelength granularity is not available and an operator has to manage a large number of channels to offer true flexibility, thus increasing the overall complexity and cost for operating the network.

Transponder architectures proposed so far that offer flexibility in the sub-wavelength granularity, for example the so-called multi-flow transponder architectures, make use of a large number of fixed-rate OTU framers and electro-optical modulators, thus leading to increased system cost.

At the same time, most existing commercial transponders do not demonstrate any of the aforementioned flexibility features, which may result to poor spectral efficiency performance for the routing and resource allocation process in networks making use of such transponders.

Moreover, existing transponder technologies do not allow disabling parts of the transponder. As a result, they always operate at the maximum possible data rate, even though the actual data traffic that needs to be carried is less, hence demonstrating poor energy efficiency.

BRIEF SUMMARY OF THE INVENTION

A transponder includes a first flow distributor configured to accept client data from a plurality of client interfaces, a plurality of electrical-to-optical transponders configured to accept client data from the first flow distributor, and a first multiplexing switch configured to connect modulated optical carriers from the plurality of transponders to a plurality of line interfaces. The plurality of electrical-to-optical transponders each include a flexible optical transport unit (OTU) framer module configured to compress multiple optical data units into a single optical data unit having a higher order than any of the multiple optical data units to form an optical transport network (OTN) frame and an electrical-to-optical modulator configured to modulate OTN frames onto an optical carrier. The transponder further includes a second multiplexing switch configured to accept modulated optical carriers from a plurality of line interfaces, a plurality of optical-to-electrical transponders configured to accept one or more modulated optical carriers from the second multiplexing switch, and a second flow distributor configured to distribute bit streams output by the plurality of optical-to-electrical transponders to a plurality of client interfaces. Each optical-o-electrical transponder includes a photodetector configured to convert the modulated optical carriers from the optical domain to the electrical domain to produce optical transport network (OTN) frames and a flexible OTU framer module configured to decompress received optical data units in respective OTN frames into multiple optical data units, each having lower order than a respective received optical data unit to form a bit stream.

A method for transmitting optical data includes distributing client data from a plurality of client interfaces to a plurality of electrical-to-optical transponders, compressing multiple optical data units of client data into a single optical data unit having a higher order than any of the multiple optical data units to form an OTN frame, modulating OTN frames onto an optical carrier, and connecting modulated optical carriers from the plurality of electrical-to-optical transponders to a plurality of line interfaces.

A method for receiving optical data includes distributing received modulated optical carriers from a plurality of line interfaces to a plurality of optical-to-electrical transponders, converting the modulated optical carriers from the optical domain to the electrical domain to produce OTN frames, decompressing received optical data units in respective OTN frames into multiple optical data units, each having lower order than a respective received optical data unit to form a bit stream, and distributing bit streams output by the plurality of optical-to-electrical transponders to a plurality of client interfaces.

DETAILED DESCRIPTION

Embodiments of the present invention provide a flexible-client, flexible-line transponder in which flexible client and line interfaces are realized using frame compression, optical frequency division multiplexing (OFDM) modulation, and link aggregation groups (LAGs). Frame compression compresses optical transport network (OTN) frames by eliminating unused tributary slots during OTN framing. The compressed frame is then de-serialized and distributed among a number of physical lanes proportional to the actual data rate carried over the OTN channel. The bit streams over the physical lanes are modulated on independent subcarriers using electrical OFDM. Finally, the subcarriers are transmitted using a single wavelength division multiplexing channel (WDM). Thus, filtering out unused timeslots during framing and establishing electrical subcarriers proportional to the effective client rate enables flexible client interfaces. At the line interface, the line rate of a WDM channel can be flexibly adapted by enabling or disabling electrical OFDM subcarriers within a WDM channel.

Multiple such modules are cross-connected using a flow distributor and a multicast switch to provide a flexible-client, flexible-line transponder that can switch from any client interface to any line interface. When client traffic exceeds the capacity of a single module, the traffic is supported through multiple WDM channels using LAGs. Thus, by link aggregation of multiple WDM channels proportional to the client traffic, flexible client and line interfaces are provided at a coarser granularity. In this way, flexible client interfaces unlock the flexibility at line interfaces.

The present embodiments enable flexible client and line interfaces at sub-wavelength granularity using frame compression and electrical OFDM, while enabling flexibility at wavelength granularity using LAG. These embodiments provide flexibility at a greater range of granularity and lower management overhead than existing approaches, and the cost of implementing the present embodiments is significantly lower than the cost of, for example, multi-flow transponder architectures, since the present embodiments use fewer optical data unit (ODU) and OTU framers and electro-optical modulators.

Furthermore, optical channels in the present embodiments can be switched right at the line interfaces in different directions. Traffic intended to different destination nodes can be split from the line interfaces in multiple directions. One application of a multicast switch toward the line interfaces enables traffic multicast and broadcast capability directly from the source node. This flexibility enables optimized routing and resource allocation in networks, leading to higher spectral efficiency. Furthermore, disabling those modules which are not used to support traffic leads to higher energy efficiency.

Figure 1:
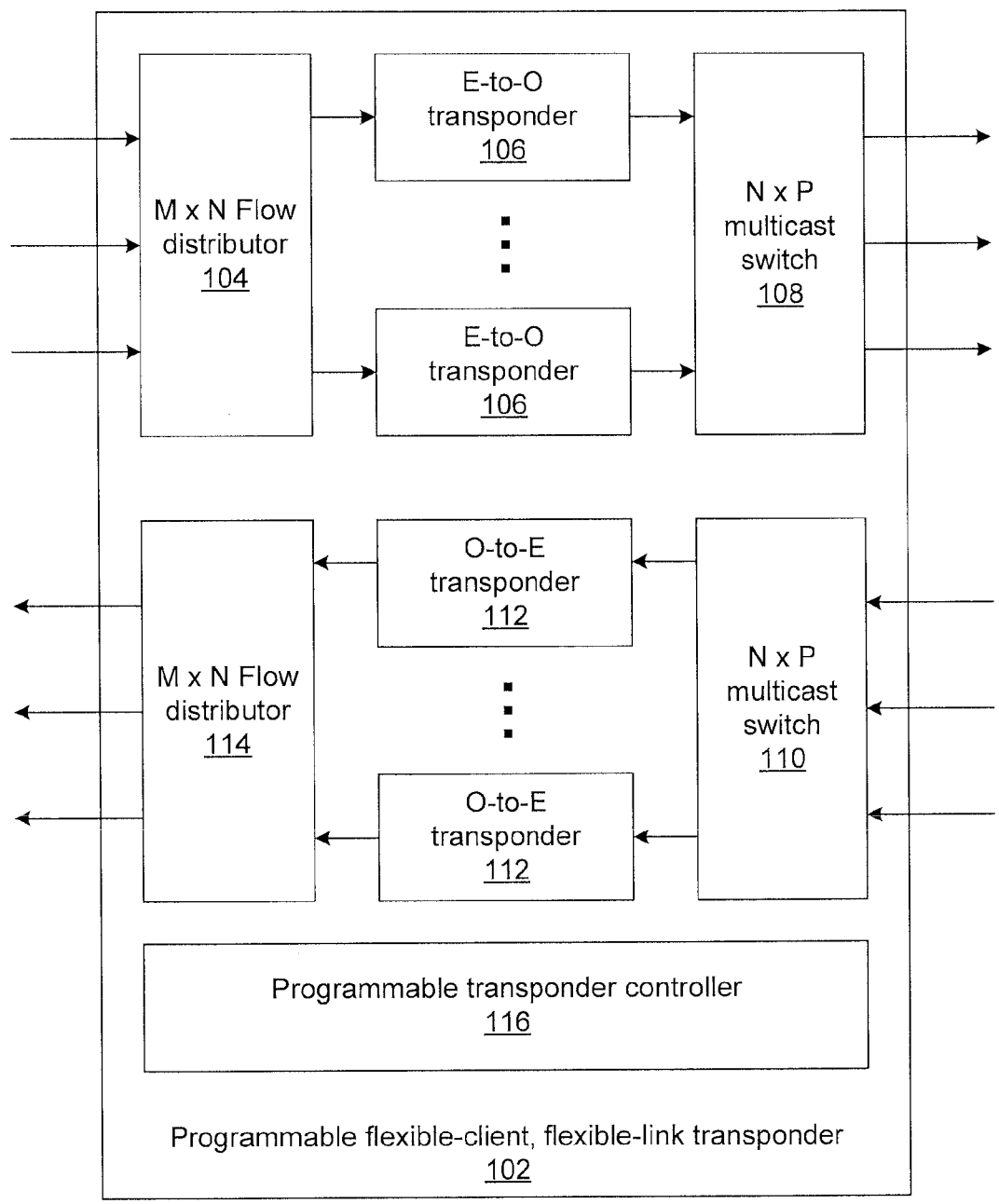
FIG. 1 is a block diagram of a flexible-client, flexible-link transponder in accordance with the present principles.

Referring now to FIG. 1, a diagram of a programmable flexible-client, flexible link transponder 102 is shown. The transponder 102 includes M client interfaces connected to different router and switch ports on the client side through the M×N flow distributors 104 and 114. Each flow distributor communicates with a respective N transponder 106 or 112. A programmable transponder controller 116 determines the frame compression ratio for the transponder 106.

The first N transponders 106 are electrical-to-optical transponders, receiving electrical signals and emitting optical outputs that carry the data provided by the clients. Each of the electrical-to-optical transponders 106 provides its output to an N×P multicast switch that accepts the N different optical outputs and optically switches them to a set of P line interfaces.

The second N transponders 112 are optical-to-electrical transponders, receiving optical signals from a second N×P multicast switch that receives P optical signals from an OTN and passes them to individual transponders 112. The transponders 112 in turn convert the optical signals to electrical signals which the second M×N flow distributor 114 passes to respective client devices.

Figure 2:
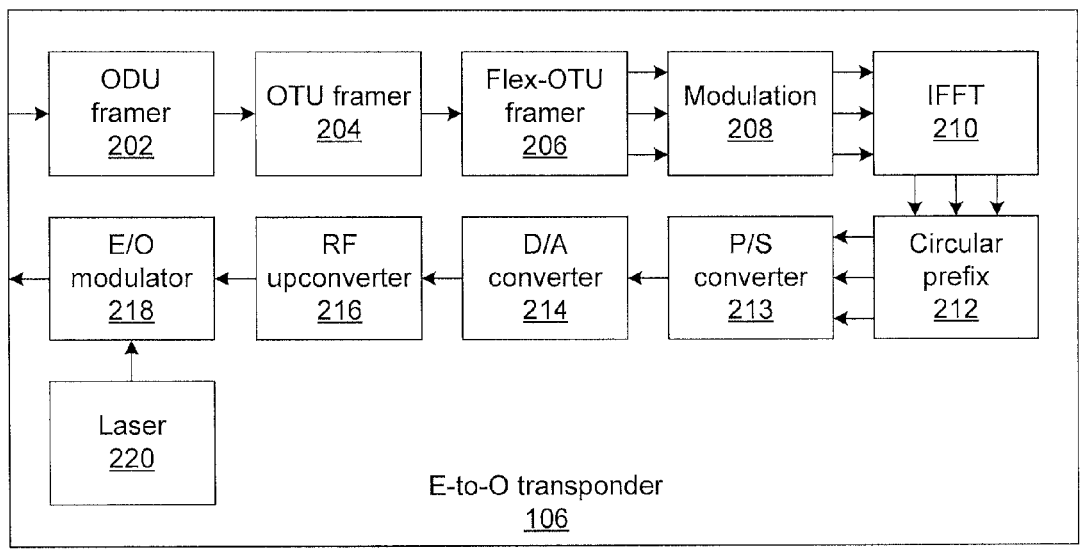
FIG. 2 is a block diagram of an electrical-to-optical transponder in accordance with the present principles.
Figure 3:
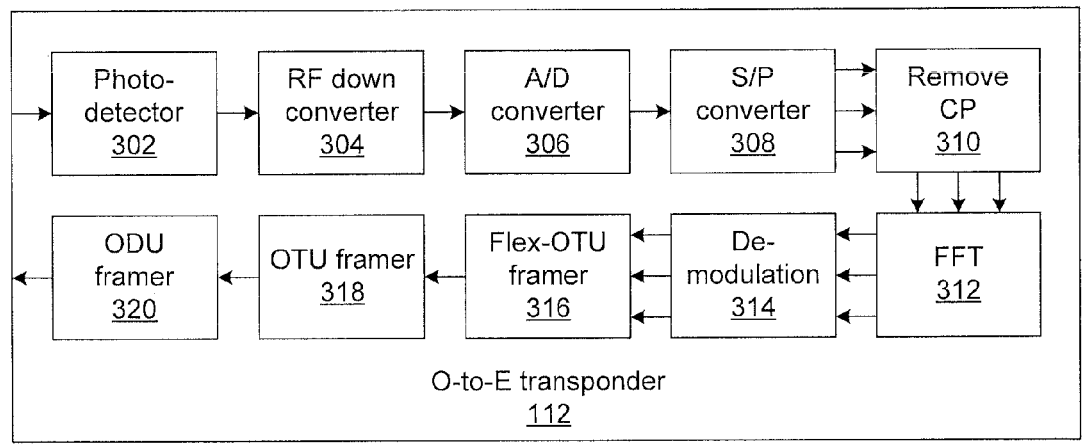
FIG. 3 is a block diagram of a optical-to-electrical transponder in accordance with the present principles.

Referring now to FIG. 2, a diagram of an electrical to optical transponder 104 is shown. The transponder 104 forwards data to an ODU framer 202. The ODU framer 202 maps the client data in ODU containers using, e.g., the generic framing procedure (GFP). The different ODU container sizes are standardized to match different client traffic volumes, such as ODUk and ODU-flex, where $0 \leq K \leq 4$. Traffic of a connection is mapped to the lowest order ODU container that has higher capacity than the traffic. Finally the lower order ODU containers are multiplexed onto a higher order ODU container, each using a number of tributary slots of the higher order ODU. An OTU framer 206 adds a header and FEC to the ODU frame to form an OTN frame. Note that if the aggregate capacity of the lower order ODUs is less than the capacity of the higher order ODU, there will be unused tributary slots in each transmitted OTN frame. Once an OTN frame is formed, the frame is forwarded to a flex-OTU framer 206.

The flex-OTU framer 206 generates compressed OTN frames from the standard OTN frames. The programmable controller 116 determines the frame compression ratio based on the line rate determined by the controller. First, the flex-OTU framer 206 identifies the unused tributary slots from the multiplex structure identifier (MSI) field of the standard OTN frame. The flex-OTU framer 206 compresses standard OTN frames by removing the unused tributary slots proportional to the selected line rate. The information of these removed tributary slots is exchanged with the receiver either by recording the information in the reserved field of the OTU header or by sending the information over either a centralized or a distributed control channel using the programmable controller 116. The compressed OTN frame is divided into, e.g., 16 bytes of data blocks, and these data blocks are distributed in a round-robin manner among the minimum number of physical lanes equivalent to support the line rate. The physical lanes on which no data blocks are transmitted may be disabled. The information about the number of active physical lanes is also sent to the receiver using the programmable controller 116 over either a centralized or a distributed control channel.

The demultiplexed data blocks are distributed among active physical layers and are mapped onto complex numbers representing the modulation format (e.g., quadrature phase shift keying, 16-quadrature amplitude modulation) in modulator 208. The modulated data is then forwarded to a processor to perform an inverse fast Fourier transform (IFFT) 210 to generate OFDM signals. A cyclic prefix is optionally added at block 212, appending a number of samples from the end of an OFDM symbol to the start of the next symbol to reduce inter-symbol interference and inter-carrier interference. The parallel data streams are then converted into a serial stream at parallel-to-serial converter 213, after which the serial stream is converted into an analog signals at the digital-to-analog converter 214. In some applications, where a specific radio frequency is needed for the electrical signal (such as in radio-over-fiber applications), an RF upconverter 216 is used to perform the frequency shift—this step is optional and does not affect the operation of the system. The signal is modulated onto the optical signal from a laser source 220 at the modulator 218, which may be for example an intensity modulator, phase modulator, and/or electro-absorption modulator.

At the receiver side, the optical-to-electrical transponder operates in reverse. A photodetector 302 receives a WDM optical signal from the multicast switch 110 and converts the optical signal to an electrical signal. An RF downconverter 305 optionally converts an RF signal down to the base band before the analog-to-digital converter 306 converts the signal to the digital domain. A serial-to-parallel converter 308 converts the serial data to a set of parallel streams, from which block 310 removes any cyclix prefix. FFT block 312 performs a fast Fourier transform before demodulator 314 converts the electrical symbols to bit streams. The bit streams are processed by a flex-OTU framer 316 that re-builds a compressed frame from 16-byte blocks received from active physical lanes and reinserts unused tributary slots that were removed at the transmitter side. Information about the locations of the unused tributary slots is delivered to the receiver either within reserved slots of the OTU header or over the centralized or distributed control channels. Once the standard frame is formed, the header and FEC overhead are removed in the OTU framer 318 and the ODU payload is forwarded to ODU framer 320, which reconstructs the original client data from the ODU payload. The client data is forwarded to the flow distributor 114 and distributed to the relevant client interfaces.

The above-described structures provide significant flexibility. The flexible OTU framers 206 and 316 compress and expand OTN frames, while the modulators 208 and 314 achieve high spectral efficiency by enabling and disabling subcarriers in proportion to the effective client traffic. Multiple transponder modules 106 and 112 are cross-connected using the multicast switches 108 and 110, and these multiple transponder modules 106 and 112 use LAG to provide flexible client interfaces at relatively coarse granularities.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
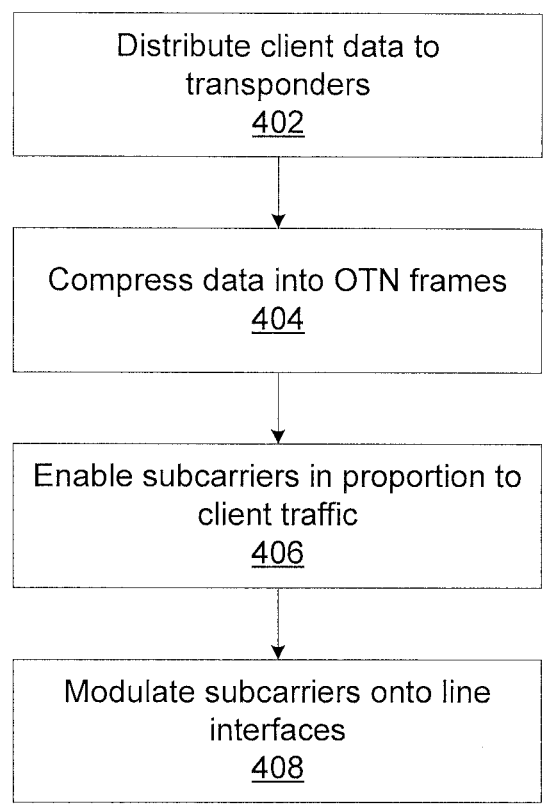
FIG. 4 is a block/flow diagram of a method for transmitting optical data in a flexible-client, flexible-link transponder in accordance with the present principles.

Referring now to FIG. 4, a method for transmitting data is shown. Block 402 distributes data from a set of client interfaces to transponders 106 using flow distributor 104. The data is compressed into OTN frames at flexible OTU framer 206, and modulators 208 enable subcarriers in proportion to the client traffic in block 406. The electrical-to-optical modulator 218 then modulates the signal onto a laser 220 to transmit the signal on a line interface via multicast switch 108.

Figure 5:
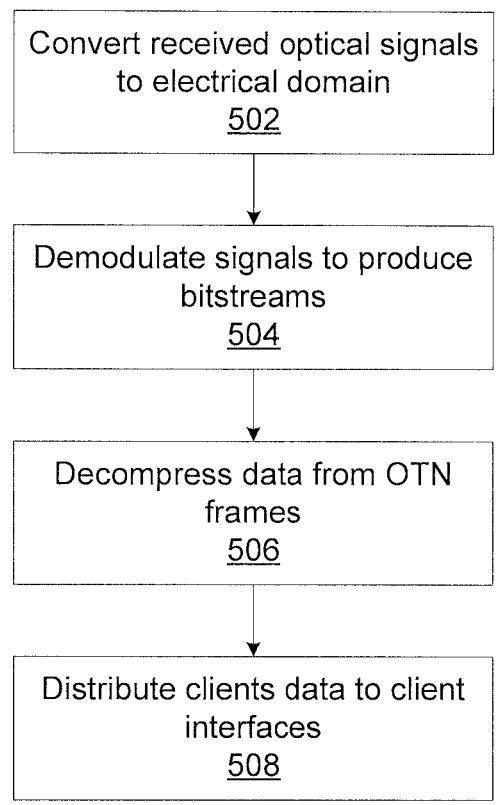
FIG. 5 is a block/flow diagram of a method for receiving optical data in a flexible-client, flexible-link transponder in accordance with the present principles.

Referring now to FIG. 5, a method for receiving data is shown. Block 502 receives a set of optical signals at multiplexing switch 110 and distributes them to the photodetectors 302 which convert the optical signals into the electrical domain. Block 504 uses the demodulators 314 to convert the received symbols into bitstreams and block 506 uses the flexible OTU framers 318 to decompress the received OTN frames. Block 508 then uses the flow distributor 114 to distribute the resulting client data to respective client interfaces.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A transponder, comprising:
  a first flow distributor configured to accept client data from a plurality of client interfaces;
  a plurality of electrical-to-optical transponders configured to accept client data from the first flow distributor, each comprising:
    a flexible optical transport unit (OTU) framer module configured to compress multiple optical data units into a single optical data unit having a higher order than any of the multiple optical data units to form an optical transport network (OTN) frame by adding and removing unused tributary slots of the formed OTN frame to avoid transmission of unnecessary data and to match a transmission rate between client and line interfaces without changing an OTN standard; and an electrical-to-optical modulator configured to modulate OTN frames onto an optical carrier;
a first multiplexing switch configured to connect modulated optical carriers from the plurality of transponders to a plurality of line interfaces;
a second multiplexing switch configured to accept modulated optical carriers from a plurality of line interfaces;
a plurality of optical-to-electrical transponders configured to accept one or more modulated optical carriers from the second multiplexing switch, each comprising:
  a photodetector configured to convert the modulated optical carriers from the optical domain to the electrical domain to produce optical transport network (OTN) frames; and
  a flexible OTU framer module configured to decompress received optical data units in respective OTN frames into multiple optical data units, each having lower order than a respective received optical data unit to form a bit stream; and
a second flow distributor configured to distribute bit streams output by the plurality of optical-to-electrical transponders to a plurality of client interfaces.

2. The transponder of claim 1, further comprising a controller configured to adapt a number of client interfaces for each of the first and second flow distributors and a number of line interfaces for each of the first and second multiplexing switches.

3. The transponder of claim 1, wherein the first flow distributor is configured to aggregate client traffic headed to a same destination at a same electrical-to-optical transponder module.

4. The transponder of claim 1, wherein the electrical-to-optical modulator of the electrical-to-optical transponders is further configured to enable and disable optical subcarriers in proportion to effective client traffic.

5. A method for transmitting optical data, comprising:
distributing client data from a plurality of client interfaces to a plurality of electrical-to-optical transponders;
compressing multiple optical data units of client data into a single optical data unit having a higher order than any of the multiple optical data units to form an optical transport network (OTN) frame, said compressing comprising adding and removing unused tributary slots of the formed OTN frame to avoid transmission of unnecessary data and to match a transmission rate between client and line interfaces without changing an OTN standard;
modulating OTN frames onto an optical carrier; and
connecting modulated optical carriers from the plurality of electrical-to-optical transponders to a plurality of line interfaces.

6. The method of claim 5, wherein distributing client data comprises aggregating client traffic headed to a same destination at a same electrical-to-optical transponder module.

7. The method of claim 5, wherein modulating comprises enabling and disabling optical subcarriers in proportion to effective client traffic.

8. A method for receiving optical data, comprising:
distributing received modulated optical carriers from a plurality of line interfaces to a plurality of optical-to-electrical transponders;
converting the modulated optical carriers from the optical domain to the electrical domain to produce optical transport network (OTN) frames;
decompressing received optical data units in respective OTN frames into multiple optical data units, each having lower order than a respective received optical data unit to form a bit stream; and
distributing bit streams output by the plurality of optical-to-electrical transponders to a plurality of client interfaces.

* * * * *